United States Patent
Bose et al.

(10) Patent No.: US 9,389,674 B2
(45) Date of Patent: Jul. 12, 2016

(54) PREDICTIVELY TURNING OFF A CHARGE PUMP SUPPLYING VOLTAGE FOR OVERDRIVING GATES OF THE POWER SWITCH HEADER IN A MICROPROCESSOR WITH POWER GATING

(71) Applicant: International Business Machines Corporation, Armonk, NY (US)

(72) Inventors: Pradip Bose, Yorktown Heights, NY (US); Alper Buyuktosunoglu, White Plains, NY (US); Hans Jacobson, White Plains, NY (US); Victor Zyuban, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 515 days.

(21) Appl. No.: 14/026,494

(22) Filed: Sep. 13, 2013

(65) Prior Publication Data
US 2015/0081123 A1 Mar. 19, 2015

(51) Int. Cl.
*G06F 1/00* (2006.01)
*G06F 1/32* (2006.01)
*G06F 1/20* (2006.01)

(52) U.S. Cl.
CPC .............. *G06F 1/3287* (2013.01); *G06F 1/206* (2013.01); *G06F 1/3206* (2013.01); *Y02B 60/1275* (2013.01); *Y02B 60/1282* (2013.01)

(58) Field of Classification Search
CPC ...... G06F 1/206; G06F 1/3206; G06F 1/3287
See application file for complete search history.

(56) References Cited

U.S. PATENT DOCUMENTS 5,457,421 A 10/1995 Tanabe
5,504,909 A 4/1996 Webster et al.
(Continued)

FOREIGN PATENT DOCUMENTS

CN 101004630 A 7/2007
EP 1037366 A2 9/2000
(Continued)

OTHER PUBLICATIONS

Kawaskaki et al. "A Sub-µs Wake-up Time Power Gating Technique with Bypass Power Line for Rush Current Support," Fujitsu Laboratories Ltd., 2008 Symposium on VLSI Circuits Digest of Technical Papers, 978-1-4244-1805-3/08, IEEE, 2 pages.
(Continued)

*Primary Examiner* — Jaweed A Abbaszadeh
*Assistant Examiner* — Austin Hicks
(74) *Attorney, Agent, or Firm* — Cantor Colburn LLP

(57) ABSTRACT

A mechanism is provided for an integrated circuit with power gating. A power header switch is configured to connect and disconnect a circuit to a common voltage source. The circuit is powered off circuit when disconnected. A multiplexer selectably connects a charge pump or common voltage source to a gate terminal of the power header switch. The charge pump provides a higher voltage to the gate terminal than the common voltage source. A controller is configured to control a selection of the multiplexer to the charge pump and the common voltage source. The controller is configured to disconnect the charge pump from the gate terminal and connect the common voltage source to the gate terminal of the power header switch in response to conditions: a prediction of a demand core power-up request, an increase in a gate leakage current, and/or a reduction in temperature of the powered off circuit.

11 Claims, 4 Drawing Sheets

(56) References Cited

U.S. PATENT DOCUMENTS

| | | |
|---|---|---|
| 6,721,885 B1 | 4/2004 | Freeman et al. |
| 6,927,619 B1 | 8/2005 | Doyle |
| 7,190,210 B2 | 3/2007 | Azrai et al. |
| 7,639,041 B1 | 12/2009 | Perisetty |
| 7,659,773 B2 | 2/2010 | Choi et al. |
| 8,190,939 B2 | 5/2012 | Fields, Jr. et al. |
| 8,327,163 B2 | 12/2012 | Chen |
| 8,519,772 B2 | 8/2013 | Chu et al. |
| 8,633,751 B2 | 1/2014 | Hegde |
| 2001/0033152 A1 | 10/2001 | Pohlman et al. |
| 2002/0089382 A1 | 7/2002 | Yang |
| 2003/0034792 A1 | 2/2003 | Ostrom et al. |
| 2005/0007178 A1 | 1/2005 | Fahim |
| 2005/0053228 A1 | 3/2005 | Mullins et al. |
| 2005/0091629 A1 | 4/2005 | Eisenstadt et al. |
| 2007/0001747 A1 | 1/2007 | Von Kaenel |
| 2008/0155280 A1 | 6/2008 | Hacking et al. |
| 2009/0235260 A1 | 9/2009 | Branover et al. |
| 2009/0292961 A1 | 11/2009 | Thurston et al. |
| 2010/0097129 A1 | 4/2010 | Itoh et al. |
| 2010/0253244 A1 | 10/2010 | Snook et al. |
| 2011/0198681 A1 | 8/2011 | Shukuri et al. |
| 2011/0204724 A1 | 8/2011 | Verma et al. |
| 2011/0221399 A1 | 9/2011 | Sawataishi et al. |
| 2012/0025953 A1 | 2/2012 | Swanson et al. |
| 2013/0099570 A1 | 4/2013 | Manohar et al. |
| 2013/0198549 A1 | 8/2013 | Longnecker et al. |
| 2014/0097702 A1 | 4/2014 | Upputuri et al. |

FOREIGN PATENT DOCUMENTS

| | | |
|---|---|---|
| EP | 1318591 A2 | 11/2003 |
| EP | 2345969 A2 | 7/2011 |
| EP | 2424092 A1 | 2/2012 |
| WO | 03079417 A2 | 9/2003 |
| WO | 2005011260 | 2/2005 |
| WO | 2005094523 A2 | 10/2005 |

OTHER PUBLICATIONS

Mark Lehn et al, "A 0.13- 1-GS/s CMOS Discrete-Time FFT Processor for Ultra-Wideband OFDM Wireless Receivers", 2011; 12 pages.

Michael Powell et al, "Gated-Vdd—a circuit technique to reduce leakage in deep-submicron cache memories", 2000, Purdue University, School of Electrical and Computer Engineering, 6 pages.

Richard Strong et al, "Fast switching of threads between cores", ACM SIGOPS Operating Systems Review, vol. 43, Issue 2, Apr. 2009, pp. 35-45; 12 pages.

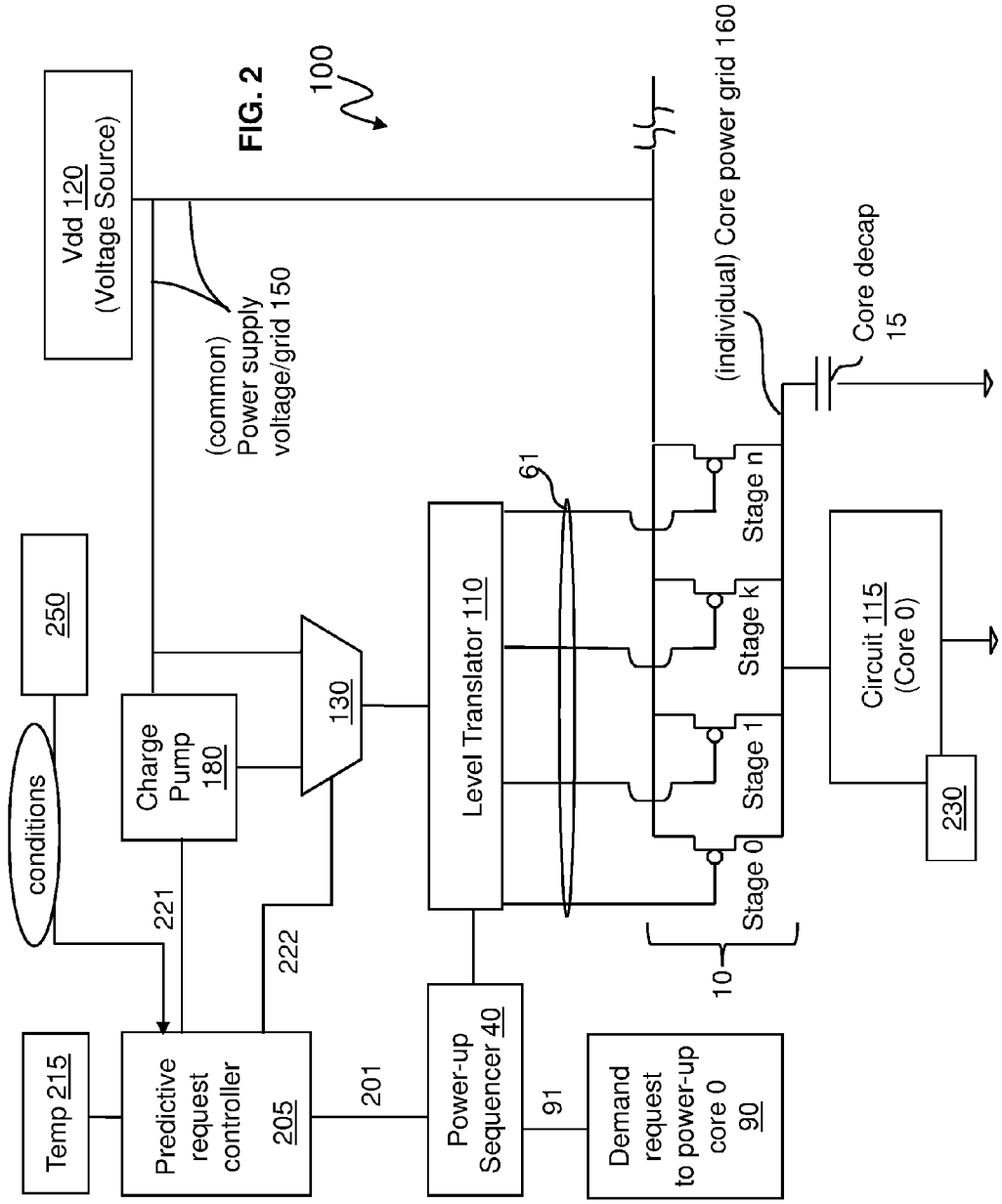

FIG. 3 300

Configure a power header switch to connect and disconnect a circuit to a common voltage source, wherein the circuit is a powered off circuit when disconnected from the common voltage source  305

↓

Configure a multiplexer to selectably connect a charge pump or the common voltage source to a gate terminal of the power header switch, wherein the charge pump provides an elevated voltage to the gate terminal than the common voltage source  310

↓

Configure a controller to control a selection of the multiplexer to the charge pump and the common voltage source, the controller configured to disconnect the charge pump from the gate terminal and connect the common voltage source to the gate terminal of the power header switch in response to: a prediction of a demand core power-up request; an increase in a gate leakage current; a reduction in a temperature of the powered off circuit  315

PREDICTIVELY TURNING OFF A CHARGE PUMP SUPPLYING VOLTAGE FOR OVERDRIVING GATES OF THE POWER SWITCH HEADER IN A MICROPROCESSOR WITH POWER GATING

BACKGROUND

The present invention relates to microprocessor cores with power gating, and more specifically, to predictively turning off charge pump supplying voltage to gates of the power switch header connected to a power gated microprocessor core.

Power gating is a technique used in integrated circuit design to reduce power consumption, by shutting off the flow of current to blocks of the circuit that are not currently in use. Power gating also reduces stand-by or leakage power.

Power gating affects design architecture of the integrated circuit, and increases time delays, as power gated modes have to be safely entered and exited. Architectural trade-offs exist between designing for the amount of leakage power saving in low power modes and the energy dissipation to enter and exit the low power modes. Shutting down the blocks can be accomplished either by software or hardware. Driver software can schedule the power down operations, or hardware timers can be utilized. A dedicated power management controller is another option.

SUMMARY

According to an embodiment, an integrated circuit with power gating is provided. The integrated circuit includes a power header switch configured to connect and disconnect a circuit to a common voltage source, where the circuit is a powered off circuit when disconnected from the common voltage source. A multiplexer is configured to selectably connect a charge pump or the common voltage source to a gate terminal of the power header switch, where the charge pump provides a higher voltage to the gate terminal than the common voltage source. A controller is configured to control a selection of the multiplexer to the charge pump and the common voltage source. The controller is configured to disconnect the charge pump from the gate terminal and connect the common voltage source to the gate terminal of the power header switch in response to at least one of a following conditions: a prediction of a demand core power-up request, an increase in a gate leakage current, and/or a reduction in a temperature of the powered off circuit.

According to an embodiment, a method of operating an integrated circuit with power gating is provided. The method includes configuring a power header switch to connect and disconnect a circuit to a common voltage source, where the circuit is a powered off circuit when disconnected from the common voltage source. A multiplexer is configured to selectably connect a charge pump or the common voltage source to a gate terminal of the power header switch, where the charge pump provides a higher voltage to the gate terminal than the common voltage source. A controller is configured to control a selection of the multiplexer to the charge pump and the common voltage source. The controller is configured to disconnect the charge pump from the gate terminal and connect the common voltage source to the gate terminal of the power header switch in response to at least one of a following conditions: a prediction of a demand core power-up request, an increase in a gate leakage current, and/or a reduction in a temperature of the powered off circuit.

According to an embodiment, a computer having power gating capability is provided. The computer includes a power header switch configured to connect and disconnect a circuit to a common voltage source, where the circuit is a powered off circuit when disconnected from the common voltage source. A multiplexer is configured to selectably connect a charge pump or the common voltage source to a gate terminal of the power header switch, where the charge pump provides a higher voltage to the gate terminal than the common voltage source. A controller is configured to control a selection of the multiplexer to the charge pump and the common voltage source. The controller is configured to disconnect the charge pump from the gate terminal and connect the common voltage source to the gate terminal of the power header switch in response to at least one of a following conditions: a prediction of a demand core power-up request, an increase in a gate leakage current, a reduction in a temperature of the powered off circuit, a reduction in drain voltage at a drain terminal of the power header switch, and/or reaching a predefined amount of time for turning on the charge pump to provide the higher voltage.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 2 illustrates modifications to the multistage multicore wakeup process of an integrated circuit.

FIG. 3 illustrates a method of operating the integrated circuit with power gating according to an embodiment.

DETAILED DESCRIPTION

Figure 1:
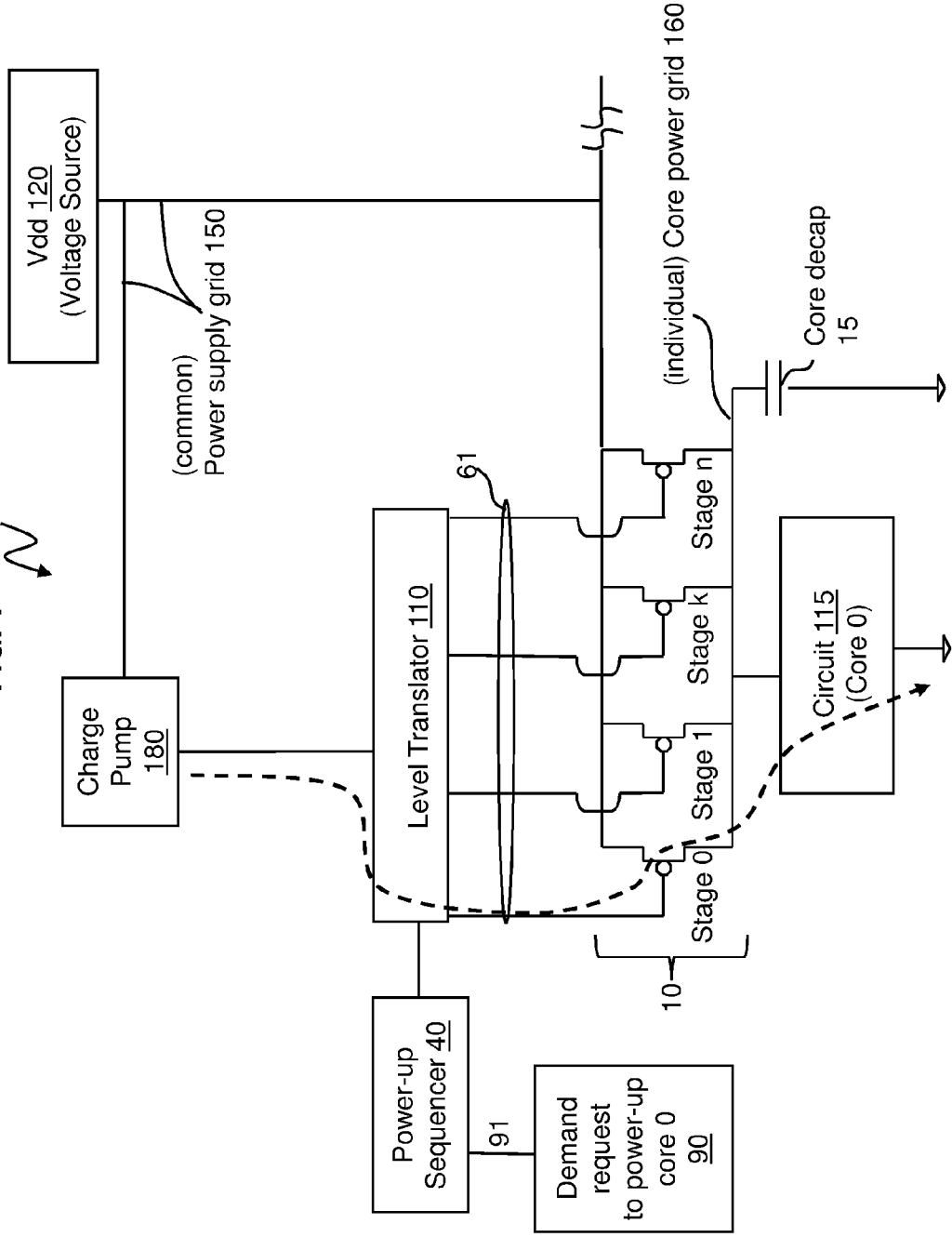
FIG. 1 illustrates a multistage multicore wakeup process of an integrated circuit.

Embodiments relate to integrated circuits and examples disclosed may be applied, for example, to a general purpose multicore processor chip attached to an accelerator (off-load engine) chip. Embodiments provide an apparatus and methods for predictively turning off the charge pump to address reduced latency of the power-up process to reduce gate leakage through the power header switch and to increase the lifetime reliability of the power header switches.

The issue with power gating at the large macro level (e.g. a complete core or an accelerator lane in a machine consisting of the general purpose multicore chip, attached to the accelerator chip) is that power gating requires significant investment in the power-up sequence of the gateable macro.

For a microprocessor, the header switch consists of multiple field effect transistor (FET) switches with an individual control turning them on or off. The control is generated by the power-up sequencer. When the core is powered up in response to a demand request, a significant amount of electrical charge is required to be supplied to the power grid of the core being powered up. Because of the high inductance path from the core power grid to the power supply, the charge cannot be supplied instantly from the power supply. Therefore, if the core is powered up too quickly the charge needed to power up the core grid is being supplied by the power grid of other running cores on the same chip. This current causes noise on the power grid of the running cores, potentially leading to the risk of a failure in one of the running cores. In order to power up a core in the state of the art, the power-up sequencer generates control signals for the sections of the header switch, turning them on in stages. Typically, a small section of the header is turned on during the first stages of the wakeup sequence in order to bring up the power grid of the core from the power-down level to a level close to the external power supply, before the next, bigger stage of the header switch is turned on. This multistage process for powering up a core leads to a significant increase in the power-up latency. Also, although the power gating helps to reduce power consumption, there may be leakage current.

For example, in a data center, servers or portions of a server often become idle (i.e., power gating) for periods of time when there is no work to be done. Even active workloads tend to exhibit bursts of activity with extensive idle periods between these bursts. Power gating of unused components, such as processor cores, provides a significant opportunity to save energy since many components have a significant amount of leakage power that is wasted when no work is being done. Keeping the power enabled at a lower voltage and frequency often uses more energy than computing at the highest frequency to finish the task quickly so that the component can be powered off, especially for compute-intensive applications.

When implementing power gating for high-performance microprocessors, one of the primary objectives is to minimize the resistive voltage drop through the power header switch and the isolated power grid (of the power gated core). Another objective is to meet stringent electro-migration current requirements both for the ground and power C4 bumps and the power grid to allow the processor to operate at a high frequency over its lifetime. These design goals lead to increasing the total size of the transistor comprising the power switch relative to the total size of the transistors comprising the microprocessor circuits that are power gated. As a result of increasing the size of the power switch devices, leakage reduction in the power gating state is diminished. The larger the size of the transistors comprising the power switch relative to the size of the transistors comprising the microprocessor circuits the less significant the leakage reduction in the power gated state (i.e., higher leakage during the power gated state means smaller degree of leakage reduction due to power gating).

When the processor enters the power gated state, the charge on the internal core power grid is transferred to the ground terminal due to the leakage through the transistors in the circuits comprising the core. As a result, the voltage of the internal power grid and the corresponding decoupling capacitance are gradually reducing, while the voltage across the source and drain terminals of the power switch is increasing. The increasing voltages between the source and drain terminals of the power switch transistors leads to an increase in the leakage current through the power switch transistors, while reducing the voltage on the internal power grid leads to reduction in the leakage current through the transistors comprising the processor circuits. The steady state is reached when the leakage current through the power switch transistors equals the leakage current through the transistors of the processor circuits. The steady state voltage depends on the ratio between the total sizes of the transistors of the power switch and the microprocessor circuits, the threshold levels of the transistors and the stacking effects in the transistors of the microprocessor circuits. In high-performance microprocessors the steady state voltage at the internal power grid is in the range of 100 mV (millivolts) to 400 mV (which is in the range of 10% to 50% of the power supply voltage). The leakage reduction in the power gated state is in the range of 0.1 to 0.05 of the other leakage in the non-power gated state, which means that 10× (10 times) to 20× leakage reduction is achieved when a circuit enters the power gated state (i.e., when the circuit is power gated).

If more significant leakage reduction in the power gated state is required, the state of the art implementation introduces an additional voltage rail which is applied to the gate terminals of the power switch transistors after the processor enters the power gated state. This rail is typically set to a higher voltage than the power supply providing the current to the microprocessor circuits. This higher power rail connected to the gate terminals of the power switch transistors is referred to as the elevated supply (e.g., via a charge pump) for power switch transistors. By setting the voltage of the elevated supply for power switch transistors 100 mV higher than the voltage of the (common) power supply for the microprocessor, the leakage current through the power switch transistors is reduced by approximately a factor of 10×. By setting the voltage of the elevated supply for power switch transistors 200 mV higher than the voltage of the power supply for the microprocessor, the leakage current through the power switch transistors is reduced by approximately a factor of 100×. In general the leakage reduction can be computed as 10^((elevated_power_supply−common_power_supply)/subthreshold_slope), where the subthreshold_slope is in the range of 70 mV to 130 mV for CMOS (complementary metal oxide semiconductor) transistors. As a result of reduced current through the power switch transistors, after the elevated supply for the power switch transistors is applied, the voltage at the internal power grid of the power gated component further discharges until the leakage through the transistors of the microprocessor circuits equals the leakage through the power switch transistors. When the elevated supply for the power switch transistors is applied, the voltage at the internal power grid is reduced down to the range of 10 mV-50 mV, and the leakage reduction of over 1000× is achieved (i.e., when the circuit is power gated and the charge pump is turned on the leakage of the circuits is 0.001× or lower than the leakage of the non-gated circuit).

The elevated supply for the power switch transistors can be supplied externally or generated internally. Implementing an external power supply to generate the elevated supply for the power switch transistors increases the system cost. Therefore, the more desired method for generating elevated supply for the power switch transistors is to generate it on-chip using circuits commonly known as a charge pump. The common implementation of charge pumps is to use switching capacitance circuits, as understood by one skilled in the art. There may be multiple implementations of the charge pump (as understood by one skilled in the art), but all of them have several key properties that may generate undesirable impact on either the latency of waking up of the power gated components or the switching power of the circuits required to operate the charge pump. In addition, the operation of the charge pump over long time intervals may create a lifetime reliability exposure in the power header switches, since the power header switch is typically implemented using thin oxide devices.

Now turning to the figures, FIG. 1 illustrates a multistage multicore wakeup process of an integrated circuit/microprocessor 100 with a charge pump. The charge pump is utilized to drive the gates of the power header switch to a higher voltage (than the common power supply voltage) to reduce gate leakage through the power header switch.

State of the art integrated systems may utilize core or sub-core (accelerator lane) level power gating. That is, one or more cores (or sub-cores) on a multicore processor can be turned off (i.e., power gated) to conserve power. Also, there is the significant wakeup time for such a power gated resource (i.e., power gated core or sub-core), once it is determined that the resource is needed back as part of the available compute resources.

In FIG. 1, a common voltage source 120 is connected to a power header switch 10. The common voltage source 120 may also be referred to as Vdd or common power supply.

Also, the power header switch 10 may be known as power gating header devices, power switches, or headers. The power header switch 10 collectively includes stage 0 header transistor, stage 1 header transistor, stage k header transistor, and stage n header transistor (all of which have their respective gate terminals (or control terminals, e.g., bases in bipolar transistors, and gates in FET devices) connected to a power-up sequencer 40 through a level translator 110 in order to receive control signals 61 (i.e., gate voltages) that individually turn on and turn off each respective stage 0 through stage n header transistor in the power header switch 10). The source terminals of the stage 0 through stage n header transistors are respectively connected to the voltage source 120 (via power supply grid 150) to supply power to circuit 115 (core 0) through their respective drains (in case of bipolar devices that would be emitter/collector terminals). Although not shown for simplicity, it is understood that additional cores (e.g., core 1, 2, 3, etc.) are respectively connected to the global power supply grid 150 (receive voltage from voltage source 120), where each core has its own power header switch analogous to the power header switch 10 shown for core 0.

Circuit 115 has a decoupling capacitor 15 (core decap), and the circuit 115 has internal capacitance. One plate of the decoupling capacitor 15 is connected to both circuit 115 and drains of stage 0 through n header transistors of power header switch 10, while the other plate is connected to ground. The decoupling capacitor 15 is designed with a charge-holding capability implemented as one or more on-chip (e.g., on the chip of the microprocessor 100) decoupling capacitors, which may be field effect transistor (FET) capacitors, deep-trench capacitors, and/or package-mounted capacitors.

The power-up sequencer 40 powers on and/or powers off the respective stage 0 through stage n header transistors in header switches 10. For example, when the circuit 115 (core 0) is being powered up from a power gated state after receiving a demand request 91 from a demand request to power-up component 90 to turn on the power gated core 0 in response to a condition that requires access to the one or more of the functions of the gated core, a significant amount of electrical charge is required to be supplied to an individual (core) power grid 160 of the circuit 115 (core 0) being powered up. Because of the high inductance path from the global power supply grid 150 to the voltage source 120 (power supply), the charge cannot be supplied instantly from the voltage source 120 (power supply) to the individual core power grid 160. Therefore, if the core 0 is powered up too quickly, the charge needed to power up the core 0 power grid 160 is being supplied by the other individual power grids of other running cores (not shown for simplicity) on the same chip. This large draw of current causes noise on the individual power grid of the running cores (also on the global power supply grid 150), potentially leading to the risk of a failure in one of the running cores.

As discussed herein, the term "demand request" refers to a request to turn on a power gated core in response to a situation that requires access to one or more of the functions of the power gated core. In other words, the power gated core must be switched from the gated (i.e., turned off) to the functional mode in order for the program execution to continue. The term "demand request to power-up component (90)" refers to any processor component capable of generating the demand request to power up the power gated cores in response to a program execution condition that requires access to the one or more functions of the power gated core. For example, a demand power-up request (91) occurs when a program execution cannot proceed without fully powering up the power gated core and/or any other condition when the computer system required a complete activation of the power gated entity.

In the state of the art in order to power up a core (e.g., core 0) that had been power gated, the power-up sequencer 40 sequentially generates the control signals 61 to sequentially turn on the transistors of the power header switch 10 in stages. Turning on stage 0 header transistor is the first stage, turning on stage 1 header transistor is the second stage, turning on stage k header transistor is the third stage, and turning on stage n header transistor is the last stage, where each transistor is larger than the previous (i.e., allowing more current to flow). Typically, a small section of the power header switch 10 is turned during the first stages of the wake-up sequence in order to bring up the power grid of the core from the power-down level to a level close to the external power supply (i.e., close to Vdd of voltage source 120), before the next, bigger stage of the header switch is turned on. This multistage process for powering up a core (e.g., core 0) leads to a significant increase in the power-up latency.

Further details of the latency are provided as an example of waking up circuit 115 (core 0) after having been turned off/powered down. When waking up the circuit 115, the power-up sequencer 40 first enables the stage 0 (i.e., first) header transistor, and then waits until the introduced noise on the global power supply grid 150 settles. Then, the power-up sequencer 40 enables the stage 1 header transistor and then waits until the introduced noise on the global power supply grid 150 settles. Next, the power-up sequencer 40 enables stage k header transistor and then waits until the introduced noise on the global power supply grid 150 settles. Finally, the power-up sequencer 40 enables stage n (last/biggest) header transistor. These sequential steps/stages take time to walk through and so introduce latency in waking up a power gated circuit (i.e., the power gated circuit 115).

In order to reduce the subthreshold leakage in the gated state a charge pump 180 is implemented which generates a voltage (at each of the gate terminals for the stage 0 through stage n transistors) higher than the voltage of the power supply grid 150 at the source terminals. The control signals controlling the gates of the power header switch 10 are translated to the level of the elevated voltage generated by the charge pump 180 by the level translator 110. When core 0 is power gated the gates of the power header switch 10 are driven (i.e., increased) to the charge pump voltage, which creates an additional back (voltage) bias between the gate terminals and source terminals of the (stage 0 through stage n transistors in the power header switch 10) power header switch 10, resulting in lowering the subthreshold leakage current through the power header switch 10.

Note that another component to the dissipated power is the gate leakage current through the power switch transistors, also known as gate leakage as understood by one skilled in the art. When the power gated circuit 115 is turned off, gate leakage occurs through the gates of the turned off header transistors in the power header switch 10. The gate leakage current flows from the charge pump 180, through the level translator 110 into the gate terminals of the power header switch (transistors) 10 (i.e., into the gate terminals of the stage 0 through stage n header transistors). In CMOS technology, the higher the voltage at the gate terminals of the FET the larger the gate leakage current. Therefore, turning on the charge pump increases the gate leakage current. Under certain conditions (such as thin gate oxide and low temperature) the gate leakage current may be a significant component of the total power, comparable in magnitude to the subthreshold leakage. Under such conditions turning off the charge pump may actually reduce the total power because of the reduction in the gate leakage current.

The lifetime reliability of the power header switch 10 is also affected by the activation of the charge pump. As known by one skilled in the art, the probability of the gate oxide defects being developed over the lifetime of the processor depends on the voltage potential across the gate oxide. Applying the elevated voltage to the gate terminals of the power switch transistors increases the voltage potential across the gate oxide. Therefore, the activation of the charge pump over prolonged intervals tends to reduce the lifetime reliability of the power header switch transistors. Moreover, the reduction of the voltage at the source terminals of the power switch transistors resulting from the activation of the charge pump leads to a further increase in the voltage potential across the gate oxide. Therefore, in order to achieve the required lifetime reliability of the microprocessor the activation of the charge pump may need to be limited to time intervals when the leakage reduction benefits from the activation of the charge pump are considerable (as discussed in embodiments).

While the charge pump 180 implementation provides a significant reduction in the sub-threshold leakage through the power header switch 10, utilizing the charge pump 180 presents the following challenges:

(1) There is increased latency of the power-up process, since using the charge pump 180 allows the core power grid 160 to be discharged to a lower level, it takes longer time to charge up the core power grid 160 of the gated core 0 using a narrow section of the power header switch 10 (e.g., first turning on stage 0 transistor, then turning on stage 1 transistor, and so forth) without introducing a significant amount of noise on the global power supply grid 150 of (i.e., connected to) the running cores.

(2) There is increased gate leakage through the header switch, since the voltage difference between the gate terminals of the power header switch 10 and the core power grid 160 is increased. The gate leakage path is shown as a dashed line.

(3) There is lifetime reliability exposure in the power header switches 10, since the power header switch 10 is typically implemented using thin oxide devices.

Now turning to FIG. 2, a modification is shown to FIG. 1. FIG. 2 illustrates a multistage multicore wakeup process for the integrated circuit/microprocessor 100 with predictive deactivation of the charge pump 180 according to an embodiment.

FIG. 2 adds a predictive request controller 205 configured to generate control signals 221 to turn off the charge pump 180 and to switch the input of the level translator circuit 110 from the charge pump voltage to the power supply grid with the help of a power supply multiplexing circuit 130. Particularly, the predictive request controller 205 generates control signal 222 that causes the power supply multiplexing circuit 130 to select the higher charge pump voltage from the charge pump 180 or to select (lower) power supply grid voltage from the voltage source 120. The higher charge pump voltage may be referred to as the elevated power supply, and the elevated power supply may be 1.5 V (typical range is 1.2V to 1.5V) while the normal (common) power supply grid 150 of the voltage source 120 is 1.0 V (typical range is 0.7V to 1.3V).

To send the control signal 221 turn off the charge pump 180 and to send the control signal 222 to switch to the lower voltage of the voltage source 120, the predictive deactivation of the predictive request controller 205 (also referred to as the charge pump controller) responds to (and/or determines) one or more of the following conditions:

(1) Prediction of the core power up request. The predictive request controller may receive/recognize a prediction core power up request which is to start powering up the power header switch 10 in advance the demand power up request 91 from the demand request to power-up component 90. By turning off the charge pump 180 via control signal 221 ahead of the demand power up request 91 and by switching to the power supply grid voltage via control signal 222, the predictive deactivation (via control signal 221) of the charge pump 180 increases the leakage of the power header switch 10 (header devices), leading to an increase in the voltage level at the core power grid 160 before the arrival of the demand power-up request 91. This, in turn, reduces the amount of time required to power up the power gated core 0 using a small section of the power header switch 10.

(2) Undesirable increase of the gate leakage (possibly) due to developed gate defects and/or other conditions such as an indication that the (current) gate leakage amount has increased compared to the (normal/previous) subthreshold leakage amount, for example, due to low temperature.

(3) Considerable reduction of the core leakage (possibly due to a temperature drop) which may result in the dropping of the core power supply level (measured on the core power grid 160) to the voltage level very close to ground, which in turn increases the voltage drop between the gate and the source terminals of the power header switch 10, exposing the gate to breakdown reliability risk.

(4) Other conditions when the reduction in the gate leakage of the gated cores is desirable. The other conditions include when the chip/microprocessor 100 temperature (as measured by the temperature measuring component 215) is very low. Also, the other conditions may include the reduction of the voltage driven by the external power supply (i.e., voltage supply) 120 or the reduction of the voltage of the power supply grid 150.

(5) Management of the lifetime of the power header switch 10. This is management to turn off the charge pump 180 to save the lifetime (of the individual stage 0 through stage n header transistors) for future situations when the very low leakage (i.e., very low stand-by power) is required.

Moreover, the predictive request controller 205 of the voltage applied to the gates of transistor in the power header switch 10 is capable of switching voltage at the gate terminals of the power header switch 10 between the elevated power supply of the charge pump 180 and the (lower) common power supply of the voltage source 120 in response to one of the conditions listed below and previously listed above. Note that in embodiments where the elevated power supply is generated by the on-chip charge pump 180, the predictive request controller 205 is also capable of turning off the charge pump 180.

For explanation purposes and not limitation, specific conditions for the predictive request controller 205 to turn off the charge pump 180 and switch to the voltage of the voltage source 120 (via the multiplexing circuit 130) are discussed with reference to five examples. Note that although subheadings are utilized below to assist the reader, the conditions in the example implementations may be combined (in the logical circuits of the predictive request controller 205) in any manner and are explained separately only for ease of understanding.

Example I

The predictive request controller 205 is configured to turn off the charge pump 180 and/or switch the voltage at the gate terminals of the header transistors in the power header switch 10 from the elevated power supply (of the charge pump 180) to the common power supply (of the voltage source 120) in response to the prediction of the demand core power up request (in advance of the demand request 91 from the demand request to power-up component 90).

As discussed herein, the power-up sequence consists of multiple steps. Each step is designed to gradually increase the voltage at the core power grid 160 without introducing noise on the power grid of the running cores (i.e., on the power supply grid 150 connected to the individual power grids of the running cores (not shown)). Turning the charge pump 180 off is typically the first step in the power-up sequence (i.e., before turning on the stage 0 header transistor), and this step of turning of the charge pump 180 is denoted as step-zero of the power-up sequence.

The predictive (charge pump) controller 205 makes a prediction of an upcoming demand power-up request 91, and the predictive controller 205 turns off the charge pump 180 ahead of (in advance to) the demand power up request 91. If the demand power-up request 91 arrives after the step-zero of the power-up sequence has been executed (that is after the charge pump 180 was turned off by the predictive controller 205), then the latency of the power-up process is reduced. That is, step-zero has been removed, and the power-up process may start with the step following the charge pump turn off step.

The following is an example of the technical detail of what happens in the microprocessor 100 when the charge pump 180 is turned off by the predictive controller 205. The voltage at the gates of the stage 0 through stage n header transistors (power header switch 10) is reduced to the level of the common power supply (of the voltage source 120). As a result, the subthreshold leakage through the header transistors (of the power header switch 10) increases by a factor of 10 to 100. The formula for computing the increase in the subthreshold leakage was given earlier: $10^{\wedge}((common\_power\_supply-elevated\_power\_supply)/subthreshold\_slope)$, where subthreshold_slope is in the range of 70 mV to 130 mV. As a result of the subthreshold leakage current increase through the header transistors, the voltage at the core power grid 160 is increasing until the voltage at the core power grid 160 reaches the voltage level at which the leakage through the header transistors (power header switch 10) equals the leakage through the circuits of the power gated core 0 (circuit 115). In one example, the voltage at the internal/individual core power grid 160 increases from 10 mV to 300 mV as a result of turning off the charge pump 180.

When the demand power-up request arrives 91, the internal/individual core power grid 160 is already precharged to a higher voltage, and the power-up sequence may start with steps following the charge pump 180 turn-off state, leading to reduced latency of the power-up process. As noted above, the charge pump 180 is turned off in response to the prediction of the core power up request. By turning off the charge pump ahead of the demand power up request the (beneficial) predictive deactivation of the charge pump 180 increases the leakage of the power switch header devices, leading to an increase of the voltage level at the core power grid before the arrival of the demand power-up request. This, in turn, reduces the amount of time required to power up the core using a small section of the power header switch.

Example II

The predictive request controller 205 is configured to turn off the charge pump 180 and/or switch the voltage at the gate terminals of the header transistors in the power header switch 10 from the elevated power supply (of the charge pump 180) to the common power supply (of the voltage source 120) in response to an increase in the gate leakage current.

Operating the gate terminals of the stage 0 through stage n header transistors (in the power header switch 10) under the elevated power supply for prolonged intervals may lead to a considerable increase in the gate leakage current, which is a current flowing into the gate terminal of the stage 0 through stage n header transistors. The reasons for the increase in the gate leakage current may include the development of gate oxide defects over time. As understand by one skilled in the art, a transistor has a gate electrode/terminal built between the source and drain electrodes/terminals over an insulator layer such as a silicon dioxide (or simply "oxide"), and the gate electrode controls the conduction between source and drain through the electric field across the oxide. As any other dielectric material, there is a maximum electric field that makes silicon dioxide (or any other thin oxide) lose its insulating properties (breakdown) as it is applied (dielectric strength). Accordingly, the elevated supply voltage of the charge pump 180 can degrade (wear out) the oxide, and eventually the oxide breaks down.

In this embodiment, the predictive controller 205 is configured to control the voltage (i.e., switch between the elevated supplied voltage by the charge pump 180 and the (lower) power supply grid voltage by the voltage source 120) applied to the gate terminals of the power header switch 10 monitors the amount of current flowing into the gate terminals of the stage 0 through the stage n header transistors of the power header switch 10.

One method of monitoring the amount of gate current flowing into the power header switch 10 (i.e., into the stage 0 through stage n header transistors) is to measure the gate voltage at the gate terminals of the header transistors and detect when the gate voltage at the gate terminals of header transistors of power header switch 10 reduces below a predefined gate voltage threshold. The method includes computing the resistive voltage drop delta_R across a resistive element with the electrical resistance R. The resistive element may be implemented as an on-chip resistor typically available in CMOS technologies, or a FET configured to operate as a resistor (i.e., PFET with its gate terminal connected to the ground and source and drain terminals connected to the gate inputs of the power switch transistors and the elevated power supply respectively). The voltage drop delta_V across the resistive element is measured, and the current flowing into the gate terminal of the power switch transistors is computed as I_gate_current=delta_V/R. For example, if the resistance R=1 KΩ (kilohm) and delta_V=100 mV, then I_gate_current=0.1 mA (milliAmps).

Another method of monitoring the amount of gate current flowing into the power header switch 10 is to switch the voltage at the gates of the power switch transistors between the elevated power supply and the common/global power supply grid 150 and compare the total current consumed by the microprocessor chip. If the total current increases after switching the gates of the power header switch 10 to the elevated power supply (from the charge pump 180) from the common/global power supply 150 (by the voltage source 120), the predictive controller 205 is configured to switch the gate terminals of the power header switch 10 to the common power supply (voltage) 150 and turn off the charge pump 180. That is, if the gate leakage current is higher when the elevated power supply voltage of the charge pump 180 is applied to the gate terminals than the total subthreshold leakage when the lower common power supply grid (voltage) 150 of the voltage source 120 is applied to the gate terminals, the predictive controller 205 determines the increased gate leakage current (of the elevated power supply) and then turns off the charge pump 180 and switches (via the multiplying circuit 130) the gate terminals to the lower common power supply grid 150. Therefore, the charge pump 180 is turned off by the predictive controller 205 in response to an undesirable increase of the gate leakage possibly due to developed gate defects and/or other conditions.

Example III

The predictive request controller 205 is configured to turn off the charge pump 180 and/or switch the voltage at the gate terminals of the header transistors in the power header switch 10 from the elevated power supply (of the charge pump 180) to the common power supply (of the voltage source 120) in response to the reduction of the microprocessor 100 chip temperature (measured temperature measuring component 215).

In this embodiment, the method of generating the control (via control signal 222 to the multiplexing circuit 130) to switch the gate terminals of the power header switch 10 from the elevated supply voltage to the global power supply voltage 150 includes the predictive controller 205 monitoring the on-chip temperature measuring component/sensors 215 (such as thermal diodes and/or digital thermal sensors) and switching the inputs of the gate terminals of the power header switch to the global power supply 150 when the chip temperature reduces below a predefined temperature threshold.

The subthreshold leakage currents through the stage 0 through stage n header transistors (of the power header switch 10) and the transistors (not shown) in the processor circuits 115 are exponentially dependent on the chip temperature (measured via temperature measuring component 215). If the temperature of the chip reduces from 85° C. to 10° C., the subthreshold leakage reduces by a factor of 3× to 4×. In many applications, this additional reduction in subthreshold leakage is sufficient to realize the required level of leakage reduction in the power gated state. As such, when the chip temperature drops below the predefined temperature threshold (in one embodiment the temperature threshold is set to 20° C.), the predictive controller 205 turns off the charge pump 180 to save the power needed to operate the circuits of the charge (power) pump 180, and/or to extend the gate oxide lifetime of the header transistors in the power header switch 10.

The predictive controller 205 continues to monitor the chip temperature. If the temperature increases above the predefined temperature threshold level, then the predictive controller 205 turns on the charge pump 180 and switches the multiplexing circuit 130 to the elevated supply voltage of the charge pump 180.

Example IV

The predictive request controller 205 is configured to turn off the charge pump 180 and/or switch the voltage at the gate terminals of the header transistors in the power header switch 10 from the elevated power supply (of the charge pump 180) to the common power supply (of the voltage source 120) in response to the reduction of the voltage at the core power grid 160 of the power gated component/core 0 (circuit 115).

When the elevated voltage V_elevated is applied to the gates of the power header switch 10 (i.e., gate terminals of the stage 0 through stage n header transistors), the voltage across the gate oxide of the header transistor equals V_elevated–V_core_grid, where the V_core_grid is the voltage at the core power grid 115 of the core, to which the drain terminals of the power header switch 10 are connected, and where V_elevated is the elevated voltage supply by the charge pump 180. If thin-oxide transistors are used for the power header switch 10, the prolonged exposure of the gate oxide to a high voltage (by the charge pump 180) may reduce the lifetime reliability of the stage 0 through stage n header transistor devices. In this embodiment, the predictive controller 205 detects the reduction of the voltage at the core power grid 160 below a predefined core voltage level which can be set at 100 mV in one case or set to 200 mV in another case, and the predictive controller 205 turns off the charge pump 180 (and switches the gate terminals to the lower voltage of the global power supply grid 150), in response to the voltage at the core power grid 160 of the (gated) core) dropping below the predefined core voltage level.

A modification of this embodiment involves the active management of the lifetime of the power header switch 10. The predictive controller 205 monitors the total amount of time the stage 0 through stage n header transistors have their gate connected to the charge pump 180 (via the multiplexing circuit 130) in order to save the lifetime of the header transistors for future situations when the very low leakage may become required. This is further discussed in the next example.

Example V

The predictive request controller 205 is configured to turn off the charge pump 180 and/or switch the voltage at the gate terminals of the header transistors in the power header switch 10 from the elevated power supply (of the charge pump 180) to the common power supply (of the voltage source 120) in response to the total amount of time that header transistors (the power header switch 10) have operated with an elevated supply voltage applied to the gate terminals exceeding (and/or reaching) a predefined count/time limit.

When the elevated voltage V_elevated is applied to the gates of the stage 0 through stage n header transistors in the power header switch 10, the voltage across the gate oxide of the header transistors equals V_elevated–V_core_grid, where the V_core_grid is the voltage at the power grid of the core 0, to which the drain terminals of the power header switch 10 is connected. If thin-oxide transistors are used for the power header switch 10, the prolonged exposure of the gate oxide to the high voltage may reduce the lifetime reliability of the stage 0 through stage n header transistor devices. In this embodiment, predictive controller 205 monitors the total amount of time (i.e., total high voltage operating time) the header transistors of the power header switch 10 have operated with the elevated voltage applied to the gate terminals. The time monitoring may be achieved by counting (via counter circuit 230) the number of cycles that the elevated supply voltage has been applied to the gate terminals. When the count exceeds a predefined count/time limit, the predictive controller 205 turns off the charge pump 180 and switches to gates terminals to the lower power supply voltage/grid 150. In one embodiment, the predefined count/time limit may be set to 50,000 hours.

It is noted the various conditions discussed in the example implementations may be combined such that the predictive request controller 205 considers all of the conditions and determines when any of the conditions apply in order to turn off the charge pump 180 and switch to the lower global power supply voltage 150.

The predictive controller 205, the power-up sequencer 40, and/or the demand request to power-up component 90 may be implemented as or include discrete logic circuits having logic gates for implementing logic functions, an application specific integrated circuit (ASIC) having appropriate combinational logic gates, programmable gate arrays (PGA), a field programmable gate array (FPGA), etc., to function as discussed herein.

The predictive request controller 205 (controller 305) includes (and/or is connected to another circuit) predictive logic (which can be hardware logic circuits and/or software implementing logic) that determines (in advance) when the circuit 115 (core 0) is to have the charge pump 180 turned off (and switch to the lower power supply voltage/grid 150). This determination (which is the prediction of the demand request to power up the core 0) may be based on past utilization history of the integrated circuit (microprocessor) 100, based on the current state of N circuits/cores of the microprocessor, based on when utilization of the circuits/cores of the microprocessor is high, based on knowledge of the operating system scheduling queue (i.e., scheduling of threads for the circuits/cores of the microprocessor), and/or based on the length of time in which the circuit has already been turned off.

Further note that the predictive request controller 205 may be connected to an on chip and/or off chip circuit 250 that provides all or some of the conditions (and related information as discussed herein) to the predictive request controller 205 in order for the predictive request controller 205 to turn on or off the charge pump 180 and then switch to the proper voltage level (e.g., the higher voltage of elevated power supply or the lower voltage of the power supply grid 150).

Now turning to FIG. 3, a method 300 is illustrated of operating the microprocessor/integrated circuit 100 with power gating according to an embodiment. Reference can be made to FIGS. 1 and 2, along with FIG. 4 discussed below.

At block 305, the power header switch 10 is configured to connect and disconnect the circuit 115 (core 0) (and other circuits/cores not shown) to the common voltage source 120, where the circuit 115 is a powered off circuit 115 (power gated core 0) when disconnected from the common voltage source 120.

At block 310, the multiplexer/multiplexing circuit 130 is configured to selectably connect the charge pump 180 or the common voltage source 120 to a gate terminal of the power header switch 10, where the charge pump 180 provides an elevated voltage to the gate terminal than the common voltage source 120.

At block 315, the predictive controller 205 is configured to control a selection of the multiplexer 130 to the charge pump 180 and to the common voltage source 120, and the controller 205 is configured to disconnect the charge pump 180 from the gate terminal and connect the common voltage source 120 to the gate terminal of the power header switch 10 in response to at least one of a following conditions: a prediction of a demand core power-up request (Example I), an increase in a gate leakage current (Example II), and/or a reduction in a temperature of the powered off circuit (Example III).

The conditions, for the predictive controller 205 to disconnect the charge pump from the gate terminal and connect the common voltage source to the gate terminal of the power header switch, further include a reduction in drain voltage at a drain terminal of the power header switch 10 (Example IV), and/or reaching a predefined amount of time/count for turning on the charge pump to provide elevated voltage (Example V).

The predictive controller 205 monitors the drain voltage (i.e., voltage at the core power grid 160) at the drain terminal to determine the reduction in the drain voltage at the drain terminal of the power header switch 10, where the drain voltage corresponds to a voltage of the powered off circuit 115 (i.e., the power gated core 0). The predictive controller 205 disconnects the charge pump 180 from the gate terminal and connects the common voltage source 120 to the gate terminal of the power header switch 10 in response to the drain voltage dropping below a predefined drain voltage. Conversely, the predictive controller 205 connects the charge pump 180 (back) to the gate terminal and disconnects the common voltage source 120 from the gate terminal of the power header switch 10 in response to the drain voltage meeting or exceeding the predefined drain voltage (i.e., predefined core voltage level in Example IV).

The predictive controller 205 monitors a total operating time for which the charge pump 180 is turned on for the powered off circuit 115, and the controller 205 turns off the charge pump 180 in response to the total operating time reaching or exceeding the predefined amount of time for turning on the charge pump (i.e., predefined count/time limit) to provide elevated voltage.

The predictive controller 205 is configured to at least one of receive and/or generate the prediction of the demand core power-up request prior to an actual demand core power-up request 91.

The predictive controller 205 is configured to determine the increase in the gate leakage current by monitoring an amount of gate current flowing into the gate terminal (Example II).

The predictive controller 205 is configured to determine the reduction in the temperature of the powered off circuit by monitoring the temperature. The predictive controller 205 disconnects the charge pump 180 from the gate terminal and connects the common voltage source 120 to the gate terminal in response to the temperature of the powered off circuit being below a predefined threshold temperature (Example II). The predictive controller 205 connects the charge pump 180 to the gate terminal and disconnects the common voltage source 120 from the gate terminal in response to the temperature of the powered off circuit meeting and/or being above the predefined threshold temperature.

Figure 4:
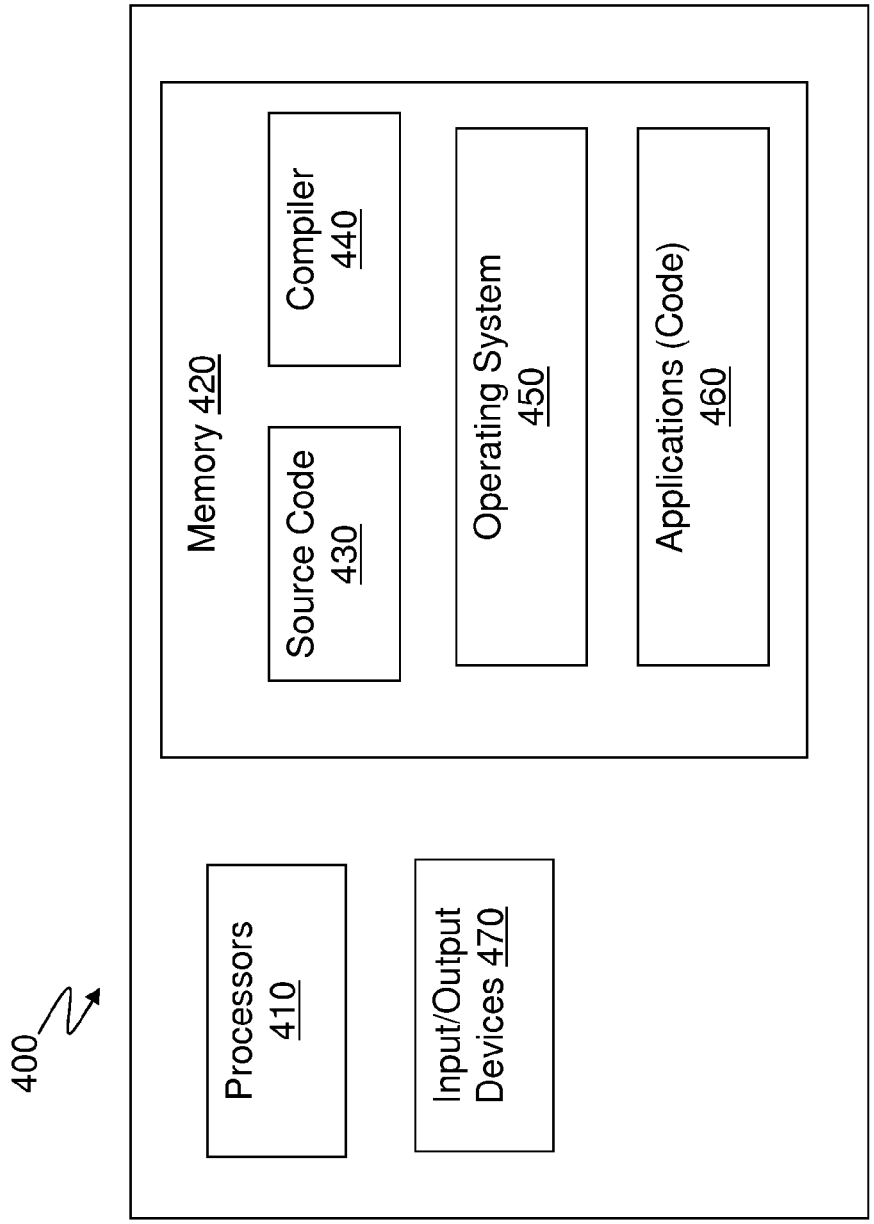
FIG. 4 is a block diagram that illustrates an example of a computer or system (computer setup) having capabilities, which may be included in and/or combined with embodiments.

Now turning to FIG. 4, an example illustrates a computer 400 (e.g., any type of computer system that includes and/or operates one or more microprocessors/integrated circuits 100) that has the power gating capability to implement features discussed herein. The computer 400 may be a distributed computer system over more than one computer. Various methods, procedures, modules, flow diagrams, tools, applications, circuits, elements, and techniques discussed herein may also incorporate and/or utilize the capabilities of the computer 400. Indeed, capabilities of the computer 400 may be utilized to implement features of exemplary embodiments discussed herein as understood by one skilled in the art.

Generally, in terms of hardware architecture, the computer 400 may include one or more processors 410, computer readable storage memory 420, and one or more input and/or output (I/O) devices 470 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 410 is a hardware device for executing software that can be stored in the memory 420. The processor 410 can be virtually any custom made or commercially available processor, a central processing unit (CPU), a data signal processor (DSP), or an auxiliary processor among several processors associated with the computer 400, and the processor 410 may be a semiconductor based microprocessor (in the form of a microchip) or a macroprocessor.

The computer readable memory 420 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 420 may incorporate electronic, magnetic, optical, and/or other types of storage media. Note that the memory 420 can have a distributed architecture, where various components are situated remote from one another, but can be accessed by the processor(s) 410.

The software in the computer readable memory 420 may include one or more separate programs, each of which comprises an ordered listing of executable instructions for implementing logical functions. The software in the memory 420 includes a suitable operating system (O/S) 450, compiler 440, source code 430, and one or more applications 460 of the exemplary embodiments. As illustrated, the application 460 comprises numerous functional components for implementing the features, processes, methods, functions, and operations of the exemplary embodiments.

The operating system 450 may control the execution of other computer programs, and provides scheduling, input-output control, file and data management, memory management, and communication control and related services.

The application 460 may be a source program, executable program (object code), script, or any other entity comprising a set of instructions to be performed. When a source program, then the program is usually translated via a compiler (such as the compiler 440), assembler, interpreter, or the like, which may or may not be included within the memory 420, so as to operate properly in connection with the O/S 450. Furthermore, the application 460 can be written as (a) an object oriented programming language, which has classes of data and methods, or (b) a procedure programming language, which has routines, subroutines, and/or functions.

The I/O devices 470 may include input devices (or peripherals) such as, for example but not limited to, a mouse, keyboard, scanner, microphone, camera, etc. Furthermore, the I/O devices 470 may also include output devices (or peripherals), for example but not limited to, a printer, display, etc. Finally, the I/O devices 470 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 470 also include components for communicating over various networks, such as the Internet or an intranet. The I/O devices 470 may be connected to and/or communicate with the processor 410 utilizing Bluetooth connections and cables (via, e.g., Universal Serial Bus (USB) ports, serial ports, parallel ports, FireWire, HDMI (High-Definition Multimedia Interface), etc.).

In exemplary embodiments, where the application 460 is implemented in hardware, the application 460 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. An integrated circuit with power gating, the integrated circuit comprising:
   a power header switch configured to connect and disconnect a circuit to a common voltage source, wherein the circuit is a powered off circuit when disconnected from the common voltage source;
   a multiplexer configured to selectably connect a charge pump or the common voltage source to a gate terminal of the power header switch, wherein the charge pump provides a higher voltage to the gate terminal than the common voltage source; and
   a controller configured to control a selection of the multiplexer to the charge pump and the common voltage source, the controller configured to disconnect the charge pump from the gate terminal and connect the common voltage source to the gate terminal of the power header switch in response to at least one of a following conditions:
   a prediction of a demand core power-up request;
   an increase in a gate leakage current above a gate leakage current threshold;
   and a reduction in a temperature of the powered off circuit below a temperature threshold.

2. The integrated circuit of claim 1, wherein the conditions, for the controller to disconnect the charge pump from the gate terminal and connect the common voltage source to the gate terminal of the power header switch, further include at least one of:
   a reduction in drain voltage at a drain terminal of the power header switch below a drain voltage threshold; and
   reaching a predefined amount of time for turning on the charge pump to provide the higher voltage.

3. The integrated circuit of claim 2, wherein the controller monitors the drain voltage at the drain terminal to determine the reduction in the drain voltage at the drain terminal of the power header switch; and
   common voltage source to the gate terminal of the power header switch in response to the drain voltage dropping below a predefined drain voltage.

4. The integrated circuit of claim 3, wherein the controller connects the charge pump to the gate terminal and disconnects the common voltage source from the gate terminal of the power header switch in response to the drain voltage meeting or exceeding the predefined drain voltage.

5. The integrated circuit of claim 2, wherein the controller monitors a total operating time for which the charge pump is turned on for the powered off circuit; and
   wherein the controller turns off the charge pump in response to the total operating time reaching or exceeding the predefined amount of time for turning on the charge pump to provide the higher voltage.

6. The integrated circuit of claim 1, wherein the controller is configured to at least one of receive and generate the prediction of the demand core power-up request prior to an actual demand core power-up request.

7. The integrated circuit of claim 1, wherein the controller is configured to determine the increase in the gate leakage current above a gate leakage current threshold by monitoring an amount of gate current flowing into the gate terminal.

8. The integrated circuit of claim 1, wherein the controller is configured to determine the reduction in the temperature of the powered off circuit below a temperature threshold by monitoring the temperature.

9. The integrated circuit of claim 8, wherein the controller disconnects the charge pump from the gate terminal and connects the common voltage source to the gate terminal in response to the temperature of the powered off circuit being below a predefined threshold temperature.

10. The integrated circuit of claim 9, wherein the controller connects the charge pump to the gate terminal and disconnects the common voltage source from the gate terminal in response to the temperature of the powered off circuit meeting or being above the predefined threshold temperature.

11. A computer having power gating capability, the computer comprising: a power header switch configured to connect and disconnect a circuit to a common voltage source, wherein the circuit is a powered off circuit when disconnected from the common voltage source;
   a multiplexer configured to selectably connect a charge pump or the common voltage source to a gate terminal of the power header switch, wherein the charge pump provides a higher voltage to the gate terminal than the common voltage source; and
   a controller configured to control a selection of the multiplexer to the charge pump and the common voltage source, the controller configured to disconnect the charge pump from the gate terminal and connect the common voltage source to the gate terminal of the power header switch in response to at least one of a following conditions:
   a prediction of a demand core power-up request;
   an increase in a gate leakage current above a leakage current threshold;
   a reduction in a temperature of the powered off circuit below a temperature threshold;
   a reduction in drain voltage at a drain terminal of the power header switch below a drain voltage threshold; and
   reaching a predefined amount of time for turning on the charge pump to provide the higher voltage.

* * * * *